tion signal.

United States Patent [19]

Imasaka et al.

[11] Patent Number: 5,582,566
[45] Date of Patent: Dec. 10, 1996

[54] RANGE-FINDING SYSTEM

[75] Inventors: Masashi Imasaka, Nishinomiya; Toshiyuki Shimizu, Takatsuki, both of Japan

[73] Assignee: Furuno Electric Co., Ltd., Hyogo-ken, Japan

[21] Appl. No.: 393,384

[22] Filed: Feb. 23, 1995

[30] Foreign Application Priority Data

Jul. 19, 1994 [JP] Japan .................. 6-009964 U

[51] Int. Cl.⁶ .................................. G01B 7/14
[52] U.S. Cl. ............... 473/407; 473/131; 367/123; 367/127; 364/410; 364/561; 342/125
[58] Field of Search .................. 273/32 R, 32 B, 273/32 H, DIG. 28; 364/410, 460, 449, 561; 473/407, 409; 342/125–126, 47, 50; 356/4.01, 5.01–5.15; 367/123, 127

[56] References Cited

U.S. PATENT DOCUMENTS

| | | | |
|---|---|---|---|
| 4,136,394 | 1/1979 | Jones et al. | 273/32 H |
| 4,703,444 | 10/1987 | Storms, Jr. et al. | 273/32 H |
| 5,056,106 | 10/1991 | Wang et al. | 273/32 B |
| 5,364,093 | 11/1994 | Huston et al. | 273/32 R |
| 5,434,789 | 7/1995 | Fraker et al. | 273/32 H |
| 5,438,518 | 8/1995 | Branco et al. | 273/32 H |

FOREIGN PATENT DOCUMENTS

| | | | |
|---|---|---|---|
| 60-95374 | 5/1985 | Japan . | |
| 4-74990 | 3/1992 | Japan . | |
| 5-19044 | 1/1993 | Japan . | |
| 6-41975 | 6/1994 | Japan . | |
| 9204080 | 3/1992 | WIPO | 273/324 |

*Primary Examiner*—Jessica J. Harrison
*Assistant Examiner*—Mark A. Sager

[57] ABSTRACT

A range-finding system for measuring a target distance from a point of measurement to a target object, comprising a slave unit for calculating and indicating the target distance based on a waiting time from transmission of an interrogation signal to reception of a response signal and a master unit placed at a certain correction distance from the target object for transmitting the response signal when a delay time corresponding to the correction distance has elapsed from reception of the interrogation signal.

25 Claims, 12 Drawing Sheets

RANGE-FINDING SYSTEM

FIELD OF THE INVENTION

This invention relates to a range-finding system for determining the distance from one point to a target object.

BACKGROUND OF THE INVENTION AND RELATED PRIOR ART STATEMENT

As an example, a golf player conventionally estimates the distance from his or her position to a flagstick (also known as a pin) by visual observation on a golf course and selects a golf club suitable for the distance. Since the selection of golf clubs significantly affects the player's scores, it is highly desirable to know the exact distance to the pin. Among known examples of the prior art, Japanese Patent Application Publication No. 60-95374 discloses a range-finding system comprising a portable transmitter which transmits an audible or ultrasonic sound signal and a solar cell powered receiver-transmitter (or a responder) which, mounted on a pin as a substitute for the flag, returns a response signal upon receiving the signal from the transmitter. The transmitter carried by a player measures the time delay from the transmission of the signal to the reception of the response signal and calculates the target distance. This system enables the player to know the exact distance to the pin by operating the transmitter.

In the above-described range-finding system, the capacity of the responder's power supply is considerably limited by its own weight and volume because the responder should be mounted on the pin. It is therefore impossible to operate the system so frequently even if the power supply is associated with solar cells for charging. Another drawback of the system is that players who have been accustomed to ordinary flagsticks could be embarrassed as they look at the responder mounted on the pin in place of the flag. Furthermore, since the mounting height of the responder is limited by the height of the pin, it is likely that signal exchanges between the transmitter and responder are difficult or limited in range if the golf course has prominent ups and downs.

As seen above, the conventional range-finding system is designed to allow measurement of the exact distance from the player's position to the target object, but the system has many problems because the responder is mounted on the pin. This means that the conventional system cannot be used in a case where it is impossible to mount the responder on the target object, not only at a golf course but also in other applications.

SUMMARY OF THE INVENTION

The invention is directed to solve the aforementioned problems of the prior art. Accordingly, it is an object of the invention to provide a range-finding system which will make it possible to determine the distance from a point of measurement to a target object by the use of a responder mounted on other than the target object.

To achieve this object, the range-finding system of the present invention comprises distance indicating means for calculating and indicating the target distance based on a waiting time from transmission of an interrogation signal to reception of a response signal and responding means placed at a certain correction distance from the target object for transmitting the response signal when a delay time corresponding to the correction distance has elapsed from reception of the interrogation signal.

In the above range-finding system, both the interrogation signal and response signal may be transmitted as sound waves, preferably in an audible frequency range. As an alternative, the interrogation signal and response signal may be sound waves and radio waves, respectively.

With thus constructed range-finding system, the responding means separated from the target object by the correction distance transmits the response signal when the delay time corresponding to the correction distance has elapsed from reception of the interrogation signal while the distance indicating means calculates the target distance based on the waiting time from transmission of the interrogation signal to reception of the response signal. For this reason, it is possible to measure the exact distance from the measuring position to the target object by using the responding means mounted at other than the location of the target object. Therefore, the range-finding system can be conveniently used for applications in which the responding means can not be mounted at the location of the target object as in the case of a golf course where a pin is placed just at the target location.

When both the interrogation signal and response signal are sound waves within an audible frequency range, the range-finding system is well applicable to a golf course featured with prominent ups and downs. Also when the response signal is set to the form of radio waves, it can not be heard by players so that more quiet environments of a golf course can be obtained compared to the case where the response signal is transmitted in the form of sound waves. Furthermore, since the interrogation signal and response signal have completely different audio and radio frequencies, there arise no interference problems in signal transmission and reception, making it possible to eventually reduce the work load required for signal processing.

These and other objects, features and advantages of the invention will become more apparent upon a reading of the following detailed disclosure of the preferred embodiments with reference to the appended drawings.

DETAILED DESCRIPTION OF THE PREFERRED EMBODIMENTS OF THE INVENTION

First Embodiment

A first embodiment of the invention will now be described by way of example, with reference to FIGS. 1 to 10 of the accompanying drawings.

Figure 1:
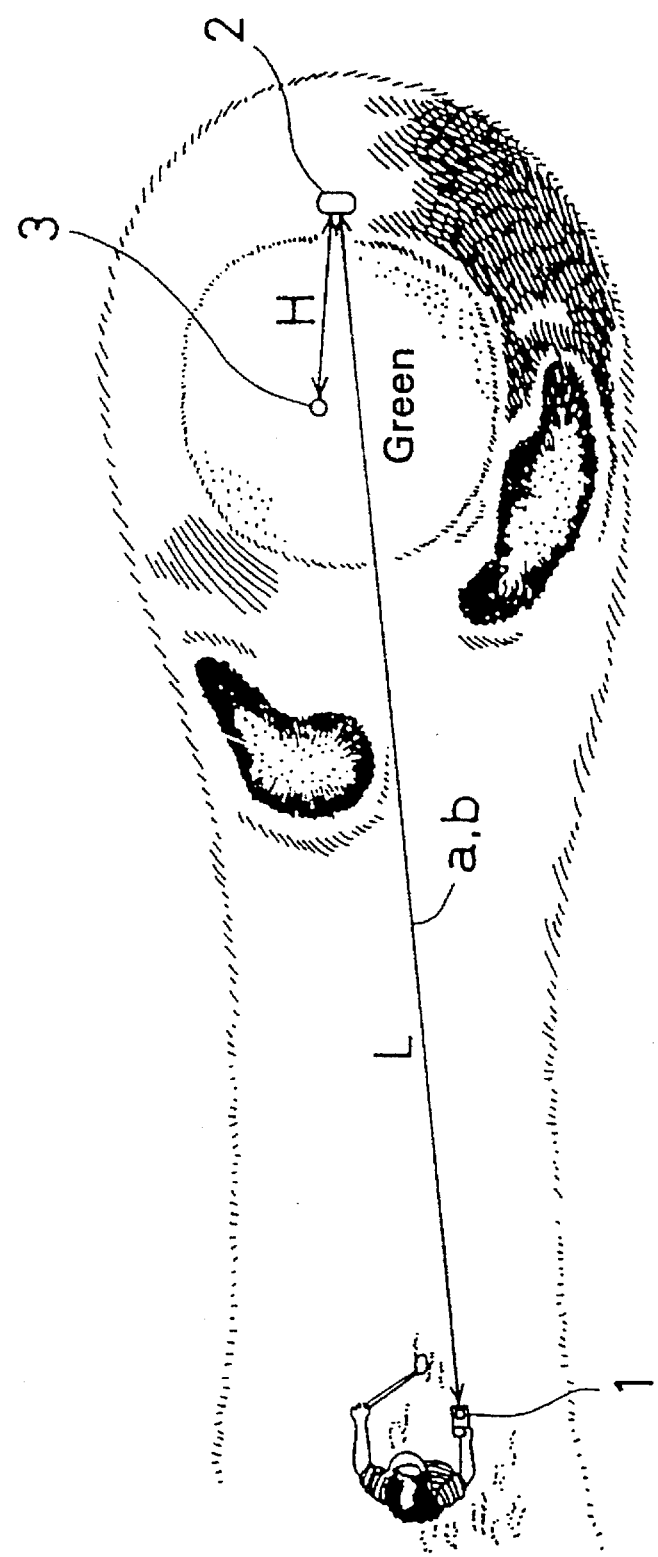
FIG. 1 is a bird's-eye view showing how a range-finding system of the present invention is deployed when in use.
Figure 2:
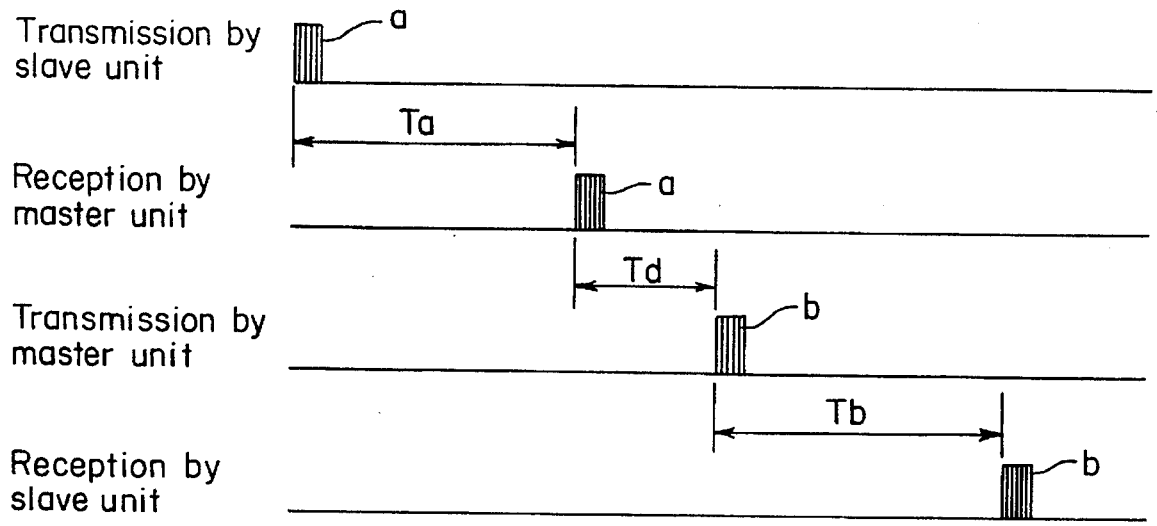
FIG. 2 is a diagram indicating a series of events occurring during a waiting time of the range-finding system.

Intended for use on a golf course, for example, a range-finding system of the present invention comprises a portable slave unit 1 to be carried by a golf player and a master unit 2 located in the vicinity of a putting green, as shown FIG. 1. The master unit 2 is directed toward the player in approximately the same direction as a pin 3, as viewed from the master unit 2. The slave unit 1 and master unit 2 can transmit an interrogation signal a and a response signal b, respectively, in an audible acoustic frequency range of 4 to 5 kHz, for instance. This frequency range has been selected because the slave unit 1 requires an excessively large speaker for sound generation impairing portability at frequencies below 4 kHz, and also because an increase in acoustic signal attenuation makes it difficult to use the system on a golf course at frequencies above 5 kHz.

The master unit 2 is designed to transmit a response signal b when delay time T has elapsed after receiving an interrogation signal a from the slave unit 1, where the delay time T corresponds to distance H between the pin 3 and master unit 2. On the other band, the slave unit constructed as to calculate the target distance L between the player and pin 3 by measuring a time duration (Ta+Td+Tb) from transmission of the interrogation signal a to reception of the response signal b, as shown The slave unit 1 and master unit 2 each have their unit identification (ID) number data corresponding to a specific hole number. Upon receiving the interrogation signal a or response signal b, they each recognize whether the received signal is addressed to themselves based on the ID number data obtained by processing the respective signals.

More specifically, the ID numbers of the slave unit and master unit 2 are predetermined as combinations of 31-bit data strings, for example. The slave unit 1 and master unit 2 transmit the interrogation signal a and response signal b, respectively, at frequencies obtained as a result of frequency modulation in accordance with the data strings. The master unit 2 demodulates the received interrogation signal a and converts its voltage value into a binary number to obtain a digital data signal. Similarly, the slave unit 1 demodulates the received response signal b and converts its voltage value into a binary number to obtain a digital data signal. The slave unit 1 and master unit 2 perform a comparison (or correlation) between the binary-coded digital data and their own ID number data. If the resultant correlation value is equal to or greater than a predefined criterion, the slave unit 1 and master unit 2 individually recognize that the received response signal b and interrogation signal a are directed to themselves, respectively.

more than one slave unit 1 is used on one hole, it is preferable that the individual slave units 1 are provided with different ID number data to prevent misoperation. Also, it is preferable that each slave unit 1 has a greater value of criterion than the master unit 2. This is because the master unit 2 is more prone to misoperation compared to the slave unit 1 which is activated by manual operation of the player since the master unit 2 utilizes the detected interrogation signal a as a trigger for transmission of the response signal b.

Figure 3A:
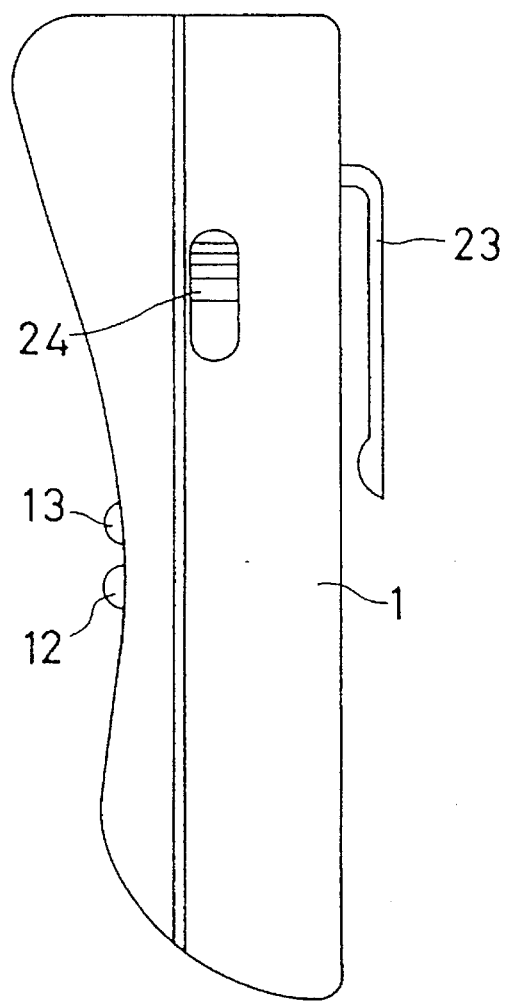
FIGS. 3(a) and 3(b) are a side view and a plan view, respectively, showing the construction of a slave unit.
Figure 3B:
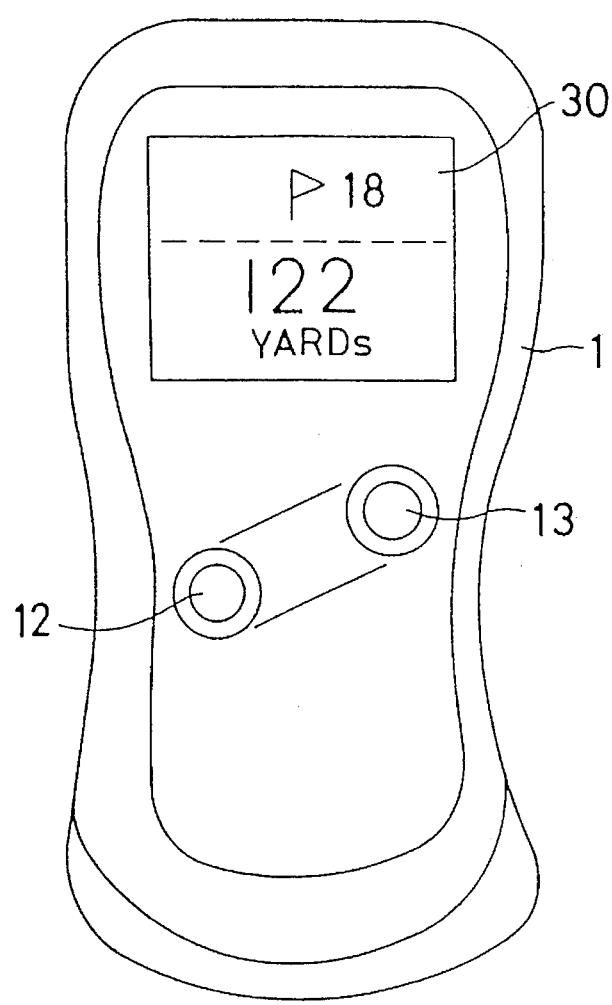
Figure 4:
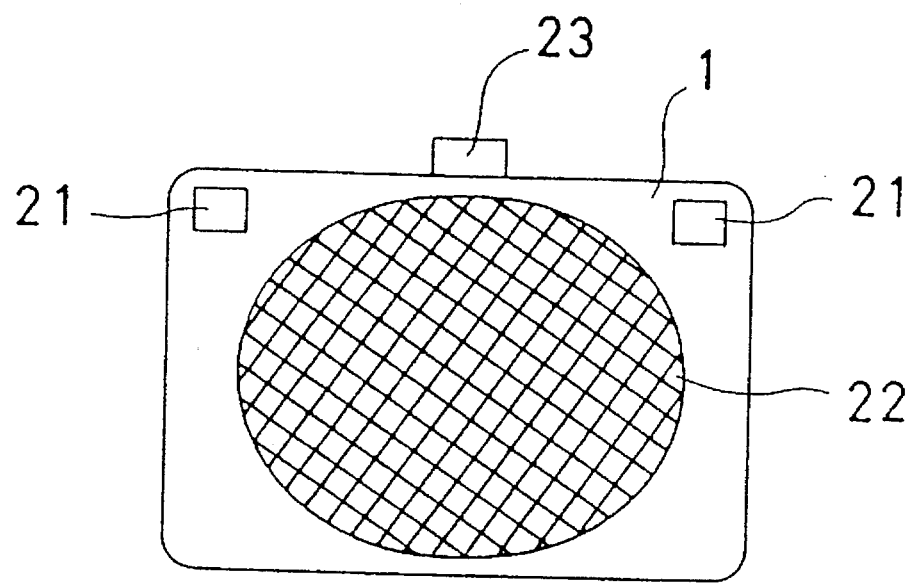
FIG. 4 is a front view of the slave unit.

Referring to FIG. 4, the slave unit 1 has charging terminals 21 and a speaker cover 22 on its front surface which is directed face to face with the master unit 2 when in use. The charging terminals 21 are connected to a chargeable battery which provides a primary supply voltage enable the slave unit 1 to operate. On the bottom (upper side in FIG. 4) of the slave unit 1, there is provided a clip 23 by which the player can hang the slave unit 1 on his or her clothes or belt, for example. As shown in FIG. 3, provided on the top surface of the slave unit 1 are a display unit 30 for indicating hole number and distance data, a transmit/OK switch 12 for causing the slave unit 1 to transmit the interrogation signal a and a hole switch 13 for specifying a hole number. Furthermore, a power switch 24 for switching on and off the primary supply voltage is provided on one side of the slave unit 1.

Figure 5:
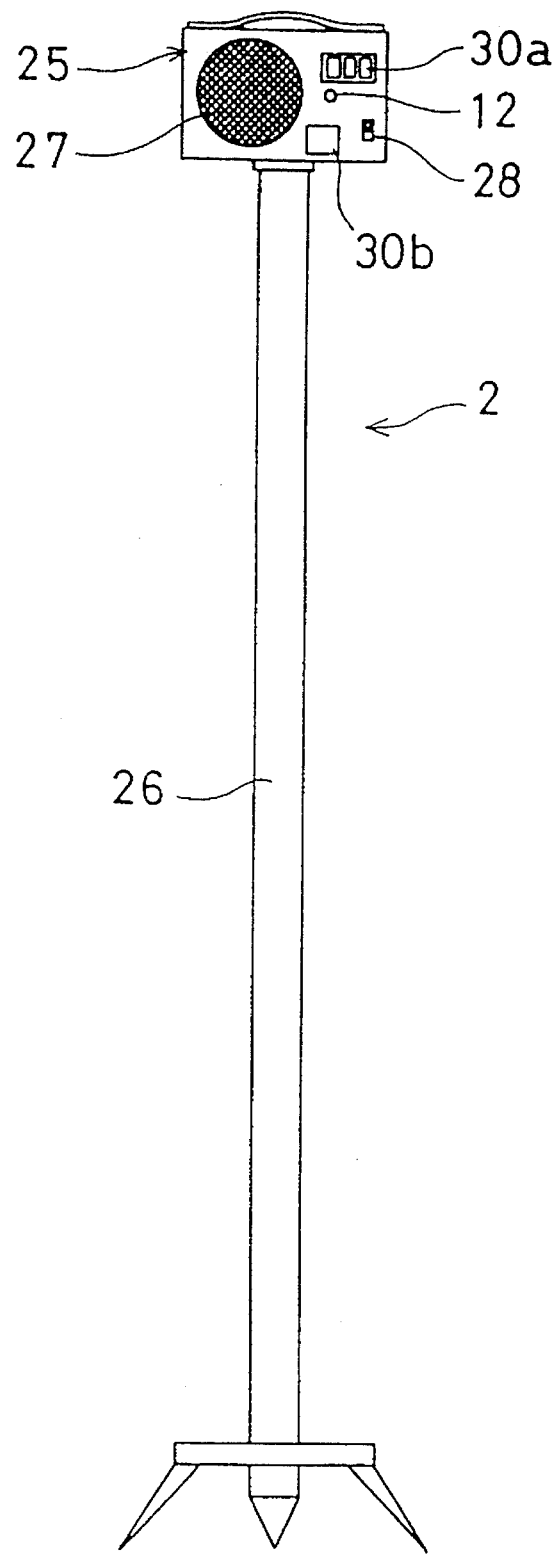
FIG. 5 is a front view of a master unit.

Referring now to FIG. 5, the master unit 2 comprises a master unit main body 25 and a supporting pole 26 for upholding the master unit main body 25. Fixed on the ground of a golf course, the supporting pole 26 makes it possible to sustain the master unit main body 25 at a desired height depending on land features of the golf course. On the front side of the master unit main body 25, there are provided a speaker cover 27, a distance readout 30a, a hole number readout 30b, a transmit/OK switch 12 for setting a correction distance value H, and a power switch 28.

Figure 6:
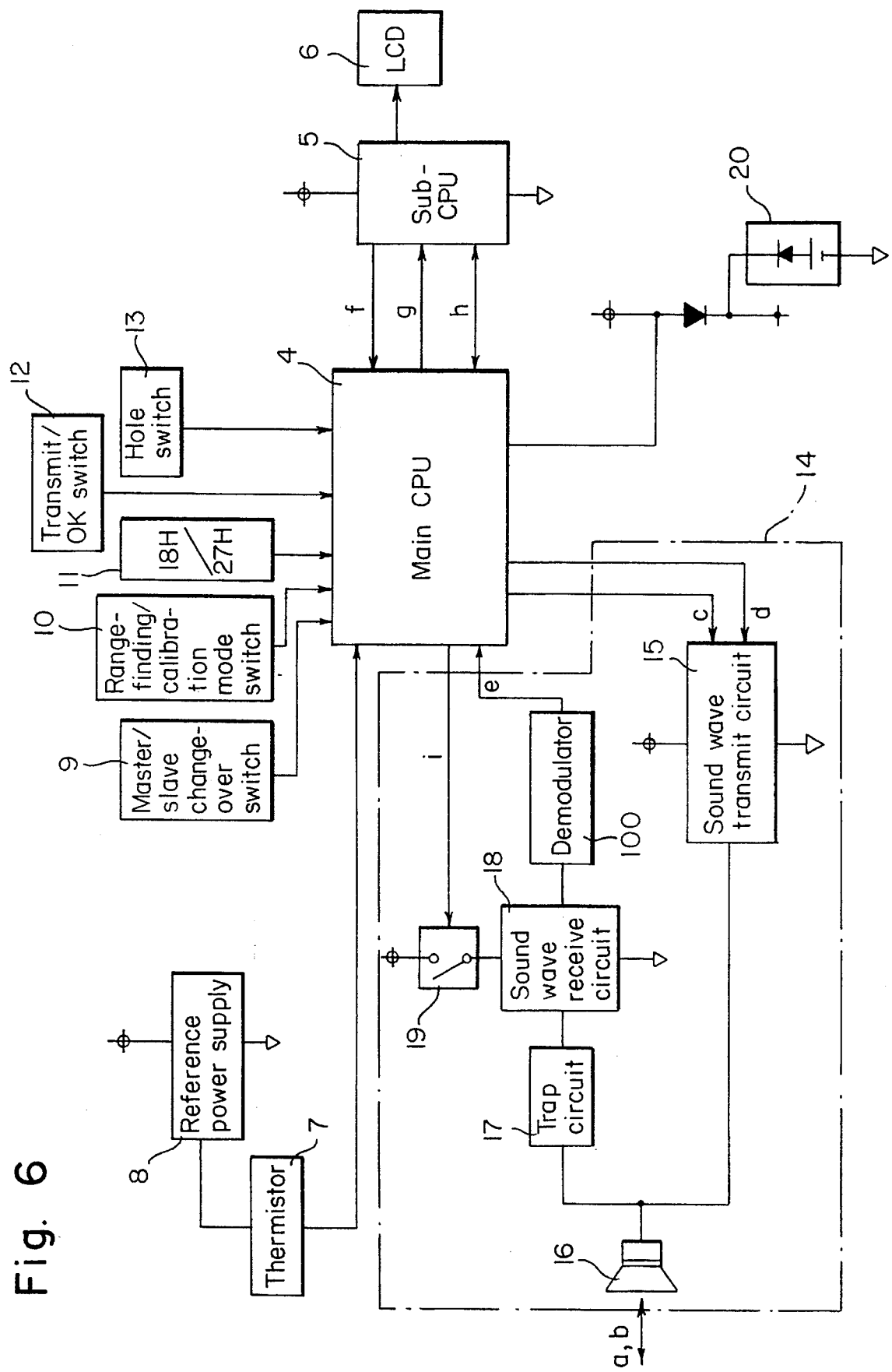
FIG. 6 is a block diagram of operating circuits of the master and slave units having the same circuit configuration according to a first embodiment of the invention.

Operating circuits of the slave unit 1 and master unit 2 have the same configuration, both comprising a main central processing unit (CPU) 4 and a sub-CPU 5, as shown in FIG. 6. Although not illustrated, the main CPU 4 has an arithmetic unit, an analog-to-digital (A/D) converter, an input/output (I/O) unit and a memory unit. The memory unit stores a range-finding mode routine, calibration mode routine, a master unit mode routine and so on as will be described later. The A/D converter is connected to a thermistor 7 of which resistance value varies in accordance with ambient temperatures, and the thermistor 7 is connected to a reference power supply 8 which outputs a constant reference current. The thermistor 7 outputs a voltage of which value is determined from its resistance value corresponding to the ambient temperature of the slave unit 1 or master unit 2 and the reference current fed from the reference power supply 8. Then, the main CPU 4 calculates the ambient temperature based on the thermistor output voltage and applies a proper correction to the sound velocity at which both the interrogation signal a and response signal b propagate.

The I/O unit of the main CPU 4 is connected to a master/slave changeover switch 9 comprising a dual inline package (DIP) switch, a range-finding/calibration mode switch 10 and an 18-hole/27-hole (18H/27H) changeover switch 11. The master/slave changeover switch 9 enables entry of a command to the main CPU 4 specifying whether a particular unit should work as a master unit 2 or a slave unit 1; the range-finding/calibration mode switch 10 enables entry of a command to the main CPU 4 specifying whether the unit should execute the range-finding mode routine or calibration mode routine; and the 18H/27H changeover switch 11 enables entry of a command to the main CPU 4 specifying the number of holes on the golf course.

The aforementioned transmit/OK switch 12 and hole switch 13 are connected to the I/O unit of the main CPU 4. The transmit/OK switch 12 is used to enter a command to the main CPU 4 for activating transmission of an interrogation signal in the case of the slave unit 1. On the other hand, the transmit/OK switch 12 is used when updating the correction distance H (or the distance between the pin 3 and master unit 2) in the case of the master unit 2. The hole switch 13 is used to enter a command to the main CPU 4 specifying the hole number at which each individual slave unit 1 or master unit 2 is used.

Also connected to the I/O unit of the main CPU 4 is a transmit/receive block 14 which transmits and receives the acoustic interrogation signal a or response signal b. The transmit/receive block 14 comprises a sound wave transmit circuit 15, a speaker block 16, a trap circuit 17, a sound wave receive circuit 18, a receive circuit power switch 19 and a demodulator circuit 100. The sound wave transmit circuit 15 has inputs for a data signal c containing ID number data as well as a gate signal d fed from the I/O unit of the main CPU 4. When the gate signal d has been received, the sound wave transmit circuit 15 reads and processes the data signal c.

The sound wave transmit circuit 15 is connected to the speaker block 16. Upon receiving an output signal from the sound wave transmit circuit 15, the speaker block 16 converts it into a sound wave which is delivered as the interrogation signal a or response signal b. Upon receiving a sound wave, i.e., the interrogation signal a or response signal b, the speaker block 16 converts it into an electrical signal, which is outputted to the trap circuit 17.

When the transmit/receive block 14 transmits a sound signal, the trap circuit 17 prevents the signal from entering the sound wave receive circuit 18. On the contrary, when the transmit/receive block 14 receives a sound signal, the trap circuit 17 delivers the signal to the sound wave receive circuit 18. The trap circuit 17 therefore serves to avoid misoperation of the transmit/receive block 14 due to unwanted signals as well as excessive power consumption. Passing through the trap circuit 17 and sound wave receive circuit 18, the received signal enters the demodulator circuit 100. Then, the demodulator circuit 100 demodulates and converts the signal into a digital data signal e, which is outputted to the main CPU 4. The sound wave receive circuit 18 delivers a high (H) level output when the frequency of the incoming signal is 4 kHz; a low (L) level output when the frequency of the incoming signal is 5 kHz, for example. The sound wave receive circuit 18 is also connected to a power supply via the receive circuit power switch 19. When a power supply control signal i is entered from the main CPU 4, the receive circuit power switch 19 provides electric power to the sound wave receive circuit 18. With this arrangement, the sound wave receive circuit 18 is caused to operate only when the main CPU 4 so requires in order to prevent unnecessary power consumption.

The main CPU 4 is also connected to the sub-CPU 5. Although not illustrated, the sub-CPU 5 has an arithmetic unit, a memory unit, a liquid crystal display (LCD) interface and a timer. The LCD interface is connected to an LCD 6, which is used as the display unit 30 of FIG. 3 in the case of the slave unit 1, the distance readout 30a and hole number readout 30b of FIG. 5 in the case of the master unit The timer of the sub-CPU 5 is so constructed that closed time periods of a particular golf course can be set depending on the length of nighttime in summer and winter seasons, for example. Based on timer settings, the sub-CPU 5 recognizes closing and opening times of the golf course and outputs a timer control signal f to the main CPU 4. The main CPU 4 then recognizes operation inhibit time period and prevent unnecessary power consumption.

There is also made provision for sending a memory data signal h including hole number data, distance data, correction distance data and so on from the main CPU 4 to the sub-CPU 5 and these data are stored in the memory unit of the sub-CPU 5. Furthermore, the main CPU 4 transmits an LCD control signal g to the sub-CPU 5 for controlling operation of the LCD 6. Controlled by the LCD control signal g, the sub-CPU 5 outputs the data stored in its memory unit to the LCD 6 for presentation, and when a predefined time period (5 seconds, for example) has passed, erases the presentation on the LCD 6 in order to reduce power consumption.

Since a low power consumption type CPU is employed as the sub-CPU 5, it still works and maintains data in its memory unit even at a secondary supply voltage, which is lower than the primary supply voltage at which the main CPU 4 can operate. The secondary supply voltage is fed from a memory backup power supply 20, which prevents loss of data in the memory unit of the sub-CPU 5 in a case where the primary power supply is interrupted when replacing a battery which supplies the primary supply voltage, for example.

Operation of the range-finding system as constructed above will be described in the following.

First, the operating circuits of the slave unit 1 and master unit 2 are initialized. Specifically, the master/slave changeover switch 9 is set to specify whether a particular unit is to be used as a slave unit 1 or master unit 2, and the 18H/27H changeover switch 11 is set to designate the number of holes on the golf course. If the unit has been set to work as a master unit 2, the hole number where the unit is intended to be installed is designated with the hole switch 13 and the ID number data corresponding to the hole number is established in the unit.

After installing the master unit 2 in the vicinity of a putting green, calibration is carried out for setting the correction distance H between the master unit 2 and pin 3 in the master unit 2 by using both the slave unit 1 and master unit 2. This calibration is re-executed whenever the pin 3 is moved to a different position.

Figure 7:
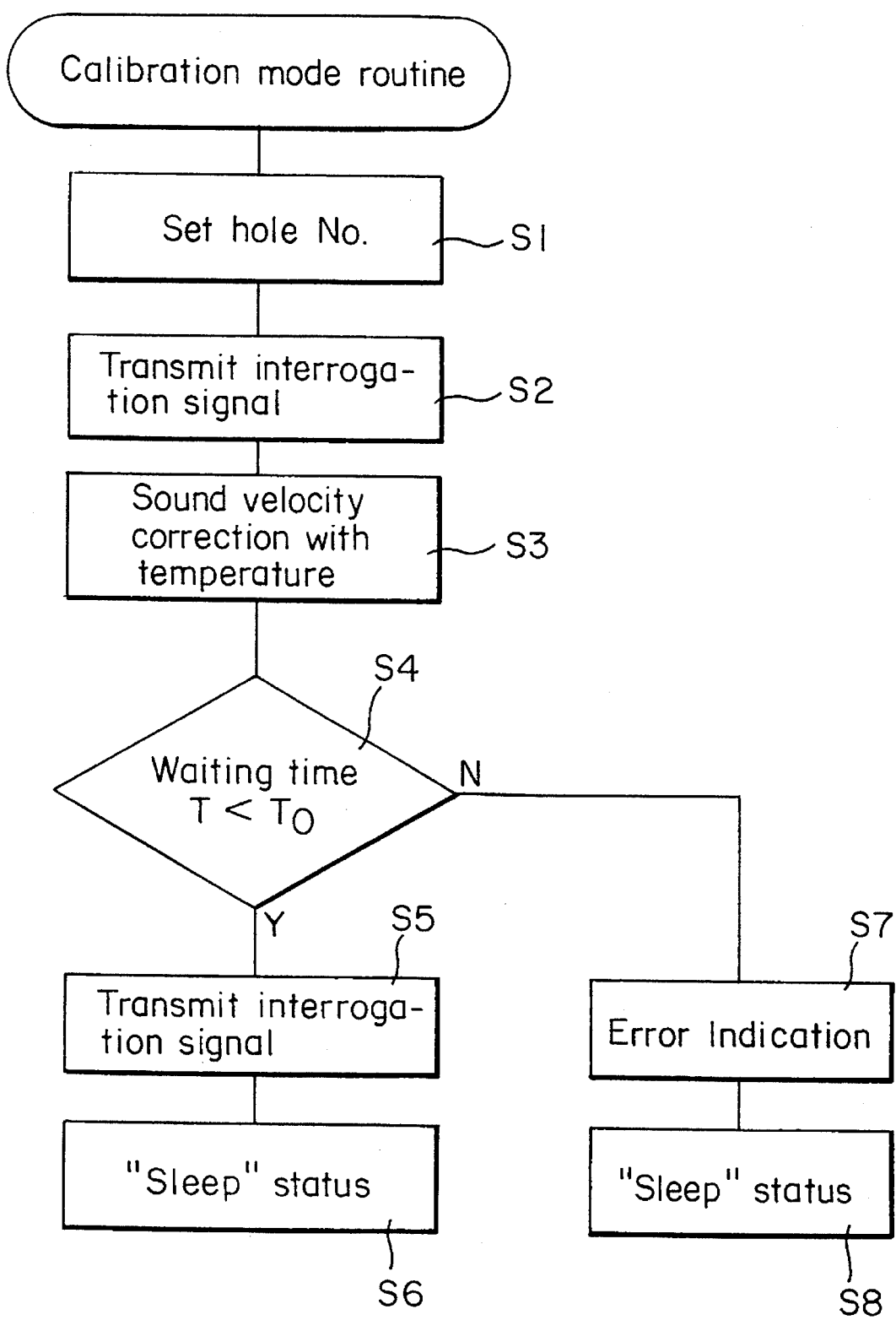
FIG. 7 is a flowchart of a calibration mode routine.

Calibration of the slave unit 1 is described in detail below. First, the slave unit 1 is set for execution of the calibration mode routine by operating the rangefinding/calibration mode switch 10. Then, as the hole switch 13 is pressed at a point where the pin 3 is mounted, the calibration mode routine is performed and the slave unit 1 recognizes the hole on which calibration is being executed with reference to the hole number set by the hole switch 13, as shown in FIG. 7 (step S1).

When the transmit/OK switch 12 is pressed, the slave unit 1 transmits the acoustic interrogation signal a containing ID number data corresponding to the hole number of the master unit 2 (step S2). The slave unit 1 converts the output voltage of the thermistor 7 into a digital value to determine the ambient temperature and applies a correction to the sound velocity data for the interrogation signal a based on the temperature (step S3). Then, the slave unit 1 counts a waiting time until the response signal b from the master unit 2 is received and judges whether the waiting time is within a predefined time T0 (step S4). If the waiting time is judged to be shorter than the predefined time T0, the slave unit 1 re-transmits the interrogation signal a to the master unit 2 (step S5) and deactivates itself, or goes into a "sleep" status (step S6). On the contrary, if the waiting time is judged to be equal to or greater than the predefined value T0, the slave unit 1 indicates an error status (step S7), regarding that no response signal b has been received from the master unit 2, and deactivates itself, or goes into a "sleep" status (step S8).

Figure 8:
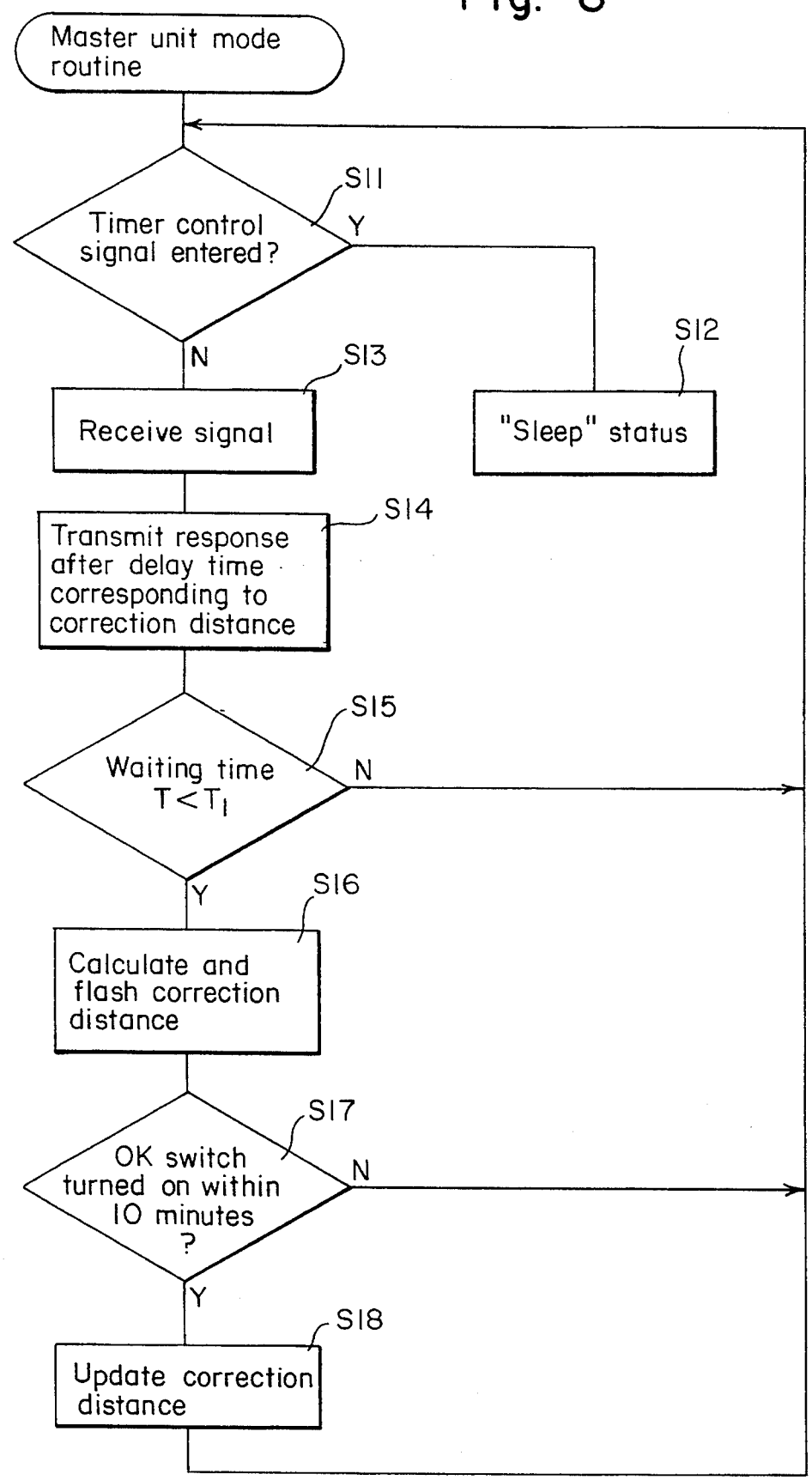
FIG. 8 is a flowchart of a master unit mode routine.

Now, calibration of the master unit 2 is described below. While executing the master unit mode routine, the master unit 2 is in a standby, or "sleep", status for receiving the interrogation signal a. Referring to FIG. 8, the master unit 2 checks whether there is any incoming timer control signal f (step S11). If the master unit 2 judges that the timer control signal f is currently entered, the master unit 2 recognizes that it is now in an operation inhibit time period and deactivates itself, or goes into a "sleep" status (step S12). In this condition, the master unit 2 can not carry out calibration even when the interrogation signal a is received from the slave unit 1 because the master unit 2 is inoperative in the "sleep" status.

If, however, the master unit 2 judges that the timer control signal f is not currently entered, it becomes ready to receive the interrogation signal a. When the interrogation signal a is received from the slave unit 1, the master unit 2 processes the interrogation signal a and verifies that the interrogation signal a has been addressed to itself (step S13). In this case, the master unit 2 returns a response signal b to the slave unit 1 when a delay time corresponding to a temporarily set correction distance H has elapsed after receiving the interrogation signal a (step S14).

The master unit 2 then counts a waiting time until the interrogation signal a re-transmitted by the slave unit 1 is received and judges whether the waiting time is within a predefined time T1 (step S15). If the waiting time becomes equal to or greater than the predefined value T1, the master unit 2 re-executes step S11 described above, regarding that no interrogation signal a has been received from the master unit 2, and waits for the interrogation signal a again in step S13.

On the other hand, if the interrogation signal a is received within the predefined time T1, the master unit 2 calculates the correction distance H between the pin 3 and master unit 2 and causes a correction distance readout to flash (step S16). Then, the master unit 2 judges whether the transmit/OK switch 12 is pressed within 10 minutes after the correction distance readout has begun to flash (step S17). If the transmit/OK switch 12 is not pressed within 10 minutes, the master unit 2 judges that the flashing correction distance H is invalid, re-executes above-described step S11 and wait for the interrogation signal a again in step S13. On the contrary, if the transmit/OK switch 12 is pressed within 10 minutes, the master unit 2 judges that the flashing correction distance H is valid, in which case the correction distance H is updated (step S18), and then the master unit 2 re-executes step S11 and wait for the interrogation signal a again in step S13.

Figure 9:
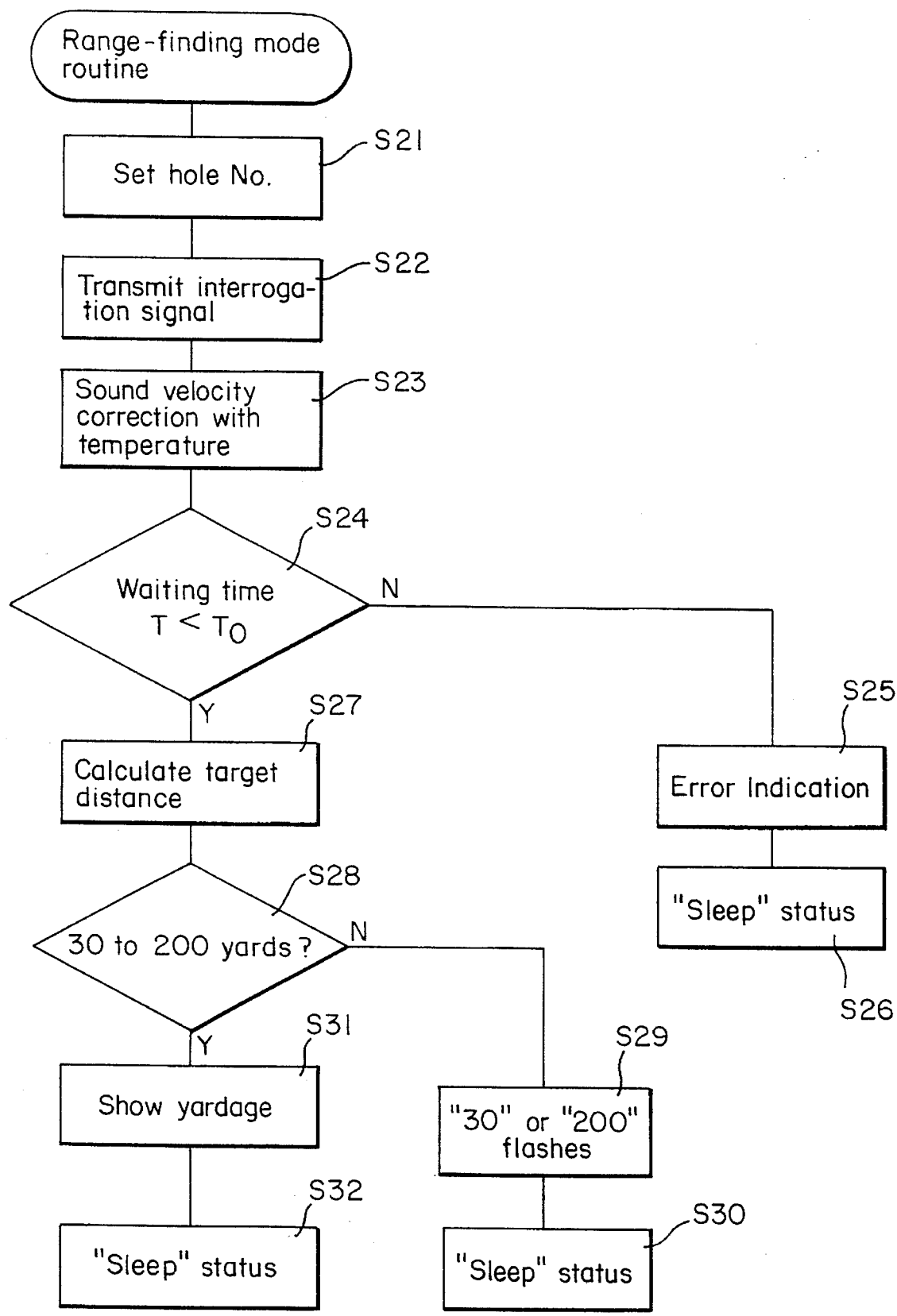
FIG. 9 is a flowchart of a range-finding mode routine.

When system calibration has been completed following the procedure seen above the slave unit 1 set to execute the range-finding mode routine by the rangefinding/calibration mode switch 10 of FIG. 6 is handed over to a golf player so that each player can measure the target distance L from his or her position up to the pin 3 by means of the slave unit 1 and master unit 2. More specifically, as illustrated in FIG. 9, the player presses the hole switch 13 of the slave unit 1 at place where he or she wishes to measure the target distance L up to the pin 3. As a result, the range-finding mode routine is executed and the hole number is set by operating the hole switch 13 (step S21).

Next, when the transmit/OK switch 12 of the slave unit 1 is pressed, the slave unit 1 transmits the acoustic interrogation signal a containing ID number data corresponding to the hole number of the master unit 2 (step S22). The slave unit 1 converts the output voltage of the thermistor 7 into a digital value to determine the ambient temperature and applies a correction to the sound velocity data for the interrogation signal a based on the temperature (step S23). Then, the slave unit 1 counts a waiting time until the response signal b from the master unit 2 is received and judges whether the waiting time is within the predefined time T0 (step S24). If the waiting time is judged to be equal to or greater than the predefined value T0, the slave unit 1 indicates an error status (step S25), regarding that no response signal b has been received from the master unit 2, and deactivates itself, or goes into a "sleep" status (step S26). On the contrary, if the waiting time is judged to be shorter than the predefined time T0, the value of the waiting time is substituted into the following equation for calculating the target distance L up to the pin 3 (step S27):

$$L=vT/2-X \quad (1)$$

where v is the sound velocity at which acoustic signals propagate, T is the waiting time of the slave unit 1 and X is a predetermined distance from the master unit 2.

Subsequently, the slave unit 1 judges whether the target distance L derived from the above equation is between 30 and 200 yards, for example (step S28). If the calculated target distance L is less than 30 yards, the slave unit 1 shows flashing numerals "30". If the calculated target distance L is greater than 200 yards, the slave unit 1 shows flashing numerals "200" (step S29). In either case, the slave unit 1 erases the flashing numerals and become inactive, or goes into a "sleep" status (step 30). On the other hand, if the calculated target distance L fails within the range of 30 to 200 yards, the slave unit 1 indicates the target distance L (step S31), erases the distance readout and deactivates itself, or goes into a "sleep" status, after a predefined time period has elapsed (step S32).

Now, operation of the master unit 2 is described below, focusing on how it works when measuring the target distance L from the player to the pin 3. As already mentioned, the master unit 2 is set to execute the master unit mode routine, that is, the master unit 2 is put in a ready-to-receive receive (or "sleep") condition when waiting for reception of the interrogation signal a. More specifically, the master unit 2 checks whether there is any incoming timer control signal f (step S11). If the master unit 2 judges that the timer control signal f is currently entered, the master unit 2 recognizes that it is now in an operation inhibit time period and deactivates itself, or goes into a "sleep" status (step S12). In this condition, the master unit 2 can not determine the target distance L to the pin 3 even when the interrogation signal a is received from the slave unit 1 because the master unit 2 is inoperative in the "sleep" status.

If, however, the master unit 2 judges that the timer control signal f is not currently entered, it becomes ready to receive the interrogation signal a. When the interrogation signal a is received from the slave unit 1, the master unit 2 processes the interrogation signal a and verifies that the interrogation signal a has been addressed to itself (step S13). In this case, the master unit 2 calculates delay time Td by substituting the correction distance H set in the calibration process into equation (2) below, and then transmits the response signal b when the delay time Td has elapsed after receiving the interrogation signal a (step S14):

$$Td=(X-H)\times 2/v \quad (2)$$

where H is the correction distance, v is the sound velocity at which acoustic signals propagate and X is a fixed distance.

Figure 10:
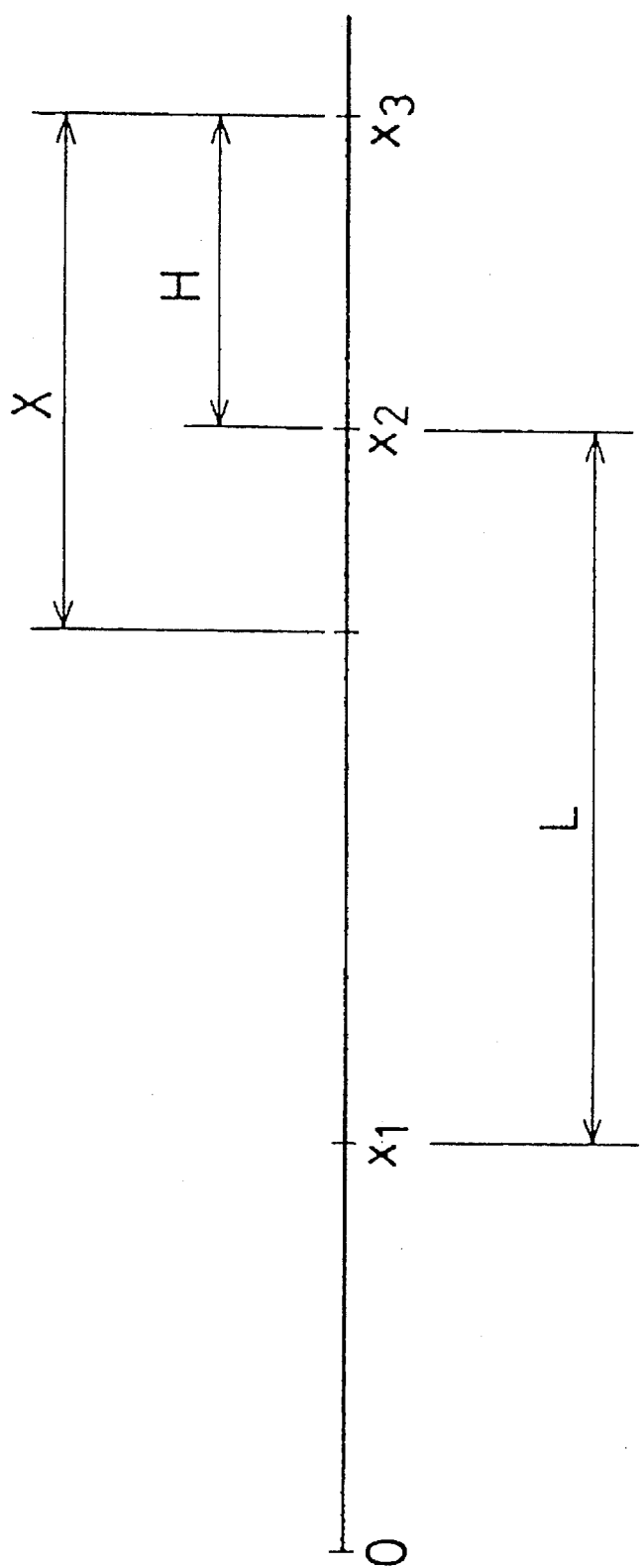
FIG. 10 is a diagram showing a positional relationship individual elements of the range-finding system.

The reason why equations (1) and (2) have been introduced in the foregoing discussion is explained in the following. Provided that the player is located at point $x_1$ (from where the target distance L is measured), the pin 3 at target point $x_2$, and the master unit 2 at point $x_3$ as shown in FIG. 10, the waiting time T of the slave unit 1 is given by the following equation:

$$T=(x_3-x_1)\times 2/v+(X-(x_3-x_2))\times 2/v \quad (3)$$

It would be understood that equation (1) applied to the slave unit 1 can be derived by modification of equation (3) above. It is to be noted that $(x_3-x_2)$ in the second term of equation (3) represents the correction distance H between the pin 3 and master unit 2 obtained in the above-described calibration process. Therefore, if time lag Td corresponding to the difference between the preset distance X and correction distance H is determined by the master unit 2, it is possible to calculate the target distance L by substituting known values (i.e., sound velocity v, waiting time T and preset distance X) into equation (1) which is obtained by modification of equation (3).

According to the above-described construction, the range-finding system comprises distance indicating means (slave unit 1) for calculating and indicating the target distance L from the player's location to the target where the pin 3 or other target object is placed, based on the waiting time T from the transmission of the interrogation signal a up to the reception of the response signal b, and responding means (master unit 2) placed at the correction distance H from the target object for transmitting the response Signal b when the delay time corresponding to the correction distance H has elapsed from the reception of the interrogation signal a.

With this arrangement, it is possible to exactly determine the target distance L by using the responding means mounted at other location than the target object and, therefore, the range-finding system can be conveniently used for applications in which the responding means can not be mounted at the location of the target object as in the case of a golf course where the pin 3 is placed just at the target location.

In one aspect of the invention, the above-described range-finding system is well applicable to a golf course featured with prominent ups and downs, for example, as it exchanges the interrogation signal a and response signal b in an audible frequency range of about 4 to 5 kHz.

In another aspect of the invention, the distance indicating means and responding means of the range-finding system are individually assigned with their unique ID number data, transmit signals containing the ID number data, and recognize that the received signals are addressed to themselves only when the result of correlation between the ID number data and own ID number data is equal to or greater than the predefined criterion. This arrangement serves to reduce the number of misoperations which would result in unnecessary power consumption.

In still another aspect of the invention, it is possible to prevent reliability deterioration of the responding means, which utilizes the received interrogation signal a for determining transmission timing of the response signal b, because the distance indicating means is set to a greater value of criterion than the responding means. This also serves to reduce unnecessary power consumption.

In a further aspect of the invention, the distance indicating means and responding means of the range-finding system have the same circuit configuration, each comprising the transmit/receive block 14 for transmitting and receiving the interrogation signal a and response signal b, the display unit 30 (LCD 6) for indicating data contents, the memory unit for rewritably storing data, a control device (main CPU 4, sub-CPU 5) for controlling those circuit elements, and switch circuits for entering commands for selecting desired operation modes (e.g., calibration mode) to the control device. Since each discrete unit can be set to work as the distance indicating means or responding means with the switch circuits, it is possible to employ circuit boards of a common design, eventually reducing materials costs.

In a still further aspect of the range-finding system of the invention, the interrogation signal a and response signal b are sound waves within a predetermined frequency range and there is provided the trap circuit 17 for filtering out signals having frequencies outside the predetermined frequency range. With this arrangement, it is possible avoid misoperation due to spurious noise which can cause unnecessary power consumption.

In a yet further aspect of the invention, the transmit/receive block 14 of the range-finding system comprises the sound wave receive circuit 18 for outputting the received signal to the control device after signal processing and the receive circuit power switch 19 for limiting active periods of the sound wave receive circuit 18 to a specified time period after signal transmission. This arrangement also serves to avoid misoperation which can cause unnecessary power consumption.

Also in the range-finding system of the invention, the display unit 30 is designed to prevent its unnecessary power consumption by erasing on-screen data when a specified time period has elapsed after displaying the data.

Furthermore, the range-finding system of the invention is provided with the memory backup power supply 20 which keeps alive data contents of the memory unit even when the control device is deactivated. Therefore, the data contents of the memory unit are kept alive even when other power supply, e.g., a battery feeding electric power to the control device is being replaced. This eliminates the need for re-entry of data, resulting in labor savings.

Furthermore, the range-finding system of the invention has the timer for specifying the operation inhibit time period of the control device. This also serves to prevent unnecessary power consumption which will otherwise occur due to operation of the control device during the operation inhibit time period.

Moreover, in the range-finding system of the invention, the distance indicating means calculates the target distance L from vT/2–X (where v is the signal propagating velocity, T is the waiting time and X is the predetermined distance from the responding means) while the responding means calculates the delay time from (X–H)×2/v (where v is the signal propagating velocity, H is the correction distance and X is the predetermined distance from the responding means). This means that the target distance L can be obtained by using the known values (v, T, X, H).

Second Embodiment

Figure 13:
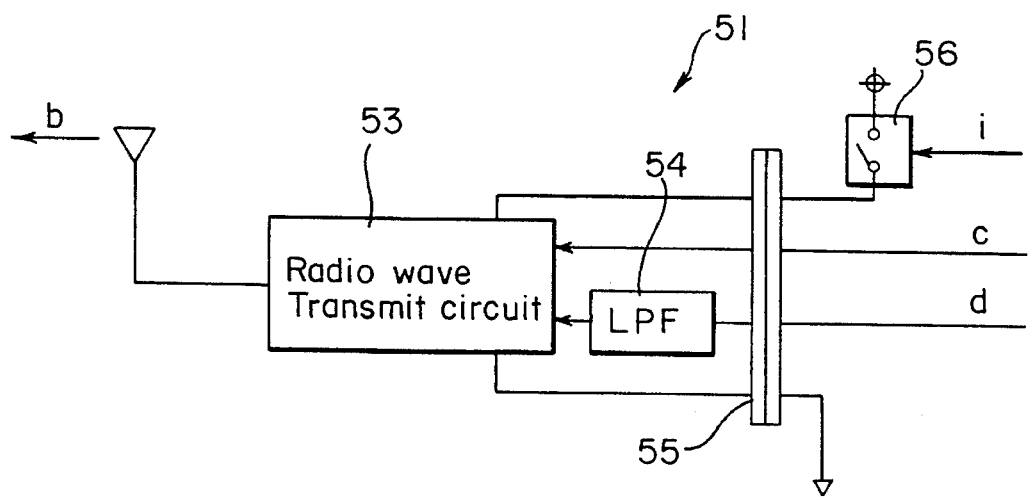
FIG. 13 is a block diagram of a radio wave transmit block according to the second embodiment of the invention.
Figure 11:
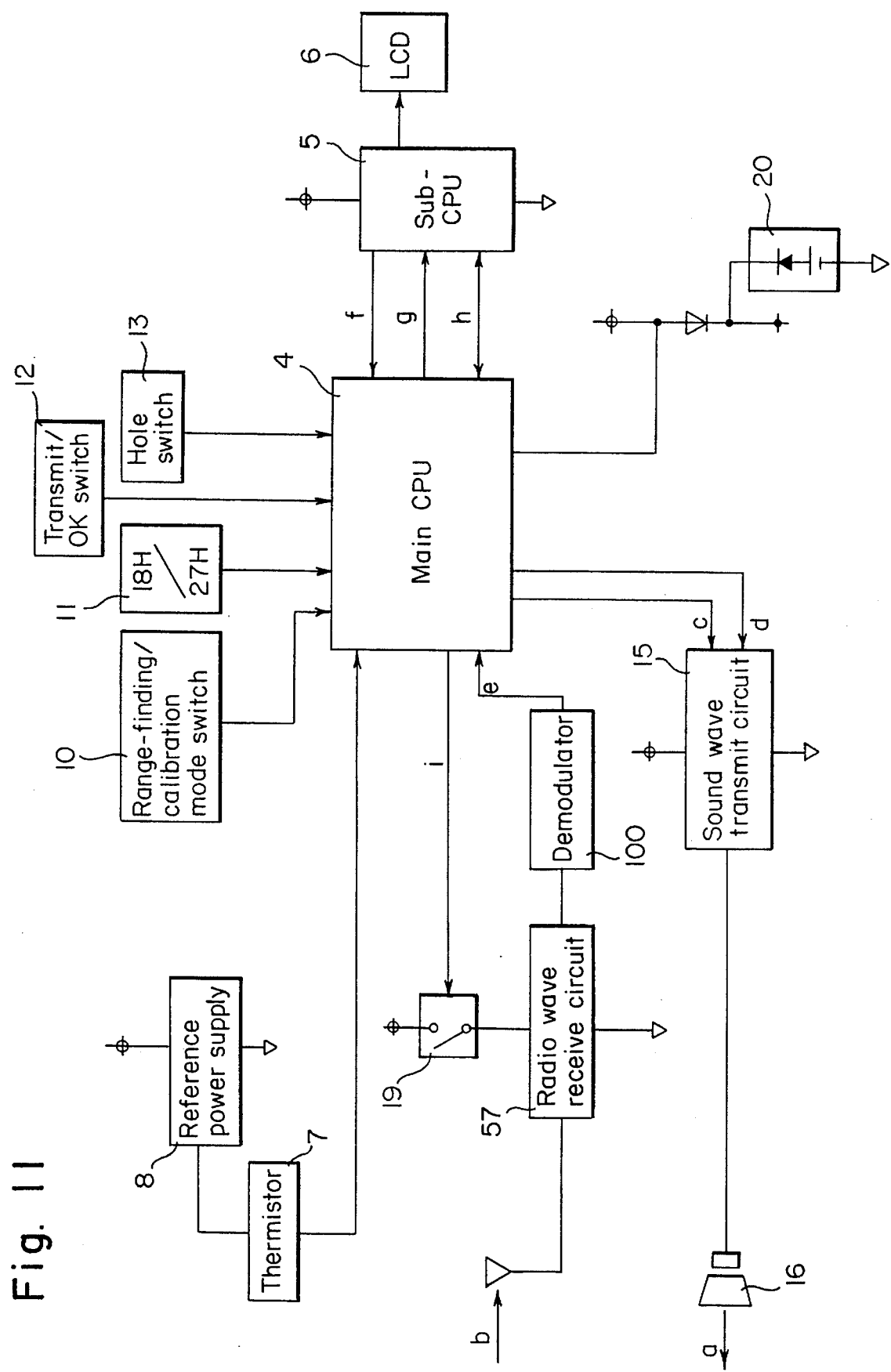
FIG. 11 is a block diagram of operating circuits of a slave unit according to a second embodiment of the invention.
Figure 12:
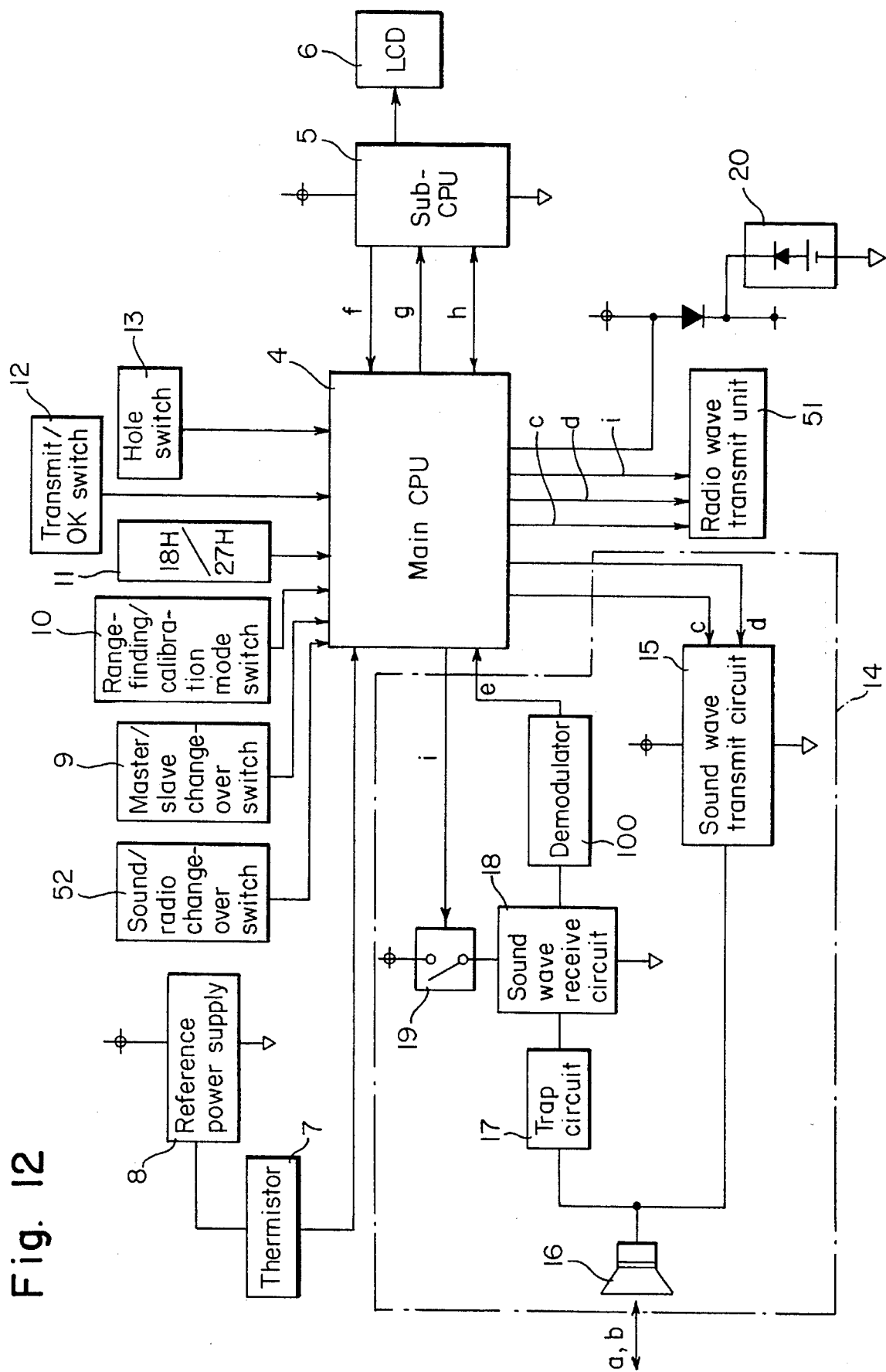
FIG. 12 is a block diagram of operating circuits of a master unit according to the second embodiment of the invention.

Referring now to FIGS. 11 to 13, a second embodiment of the invention will be described in the following, where members identical to those described with reference to the first embodiment will be designated by the same reference numbers and their functional description will be omitted.

in a range-finding system according to the second embodiment of the invention, operating circuits of a master unit 2 include a sound/radio changeover switch 52 for switching its response signal b between sound wave and radio wave modes and a radio wave transmit block 51 for transmitting the response signal b in the form of radio waves at a frequency of about 426 MHz, for example, as shown in FIG. 12. The radio wave transmit block 51 comprises a radio wave transmit circuit 53, a low-pass filter (LPF) 54 for preventing misoperation, a connector 55 for making the radio wave transmit circuit 53 detachable from the master unit 2, and a transmit circuit power switch 56 which works like the previously described receive circuit power switch 19, as shown in FIG. 13. When the sound/radio changeover switch 52 is set to "radio" mode and a gate signal d is entered via the LPF 54, the radio wave transmit circuit 53 reads and processes a data signal c and then outputs the radio frequency response signal b. Other parts of the circuit configuration of the master unit 2 are the same as already described with reference to the first embodiment.

On the other hand, operating circuits of a slave unit according to the second embodiment include a radio wave receive circuit 57 to which the radio frequency response signal b sent from the master unit 2 is entered, as shown in FIG. 11. The radio wave receive circuit 57 delivers the received response signal b to a demodulator circuit 100. The demodulator circuit 100 demodulates and converts the incoming signal into a digital data signal e and outputs to the main CPU 4. Other parts of the circuit configuration of the slave unit 1 are the same as already described with reference to the first embodiment, with the exception that the master/slave changeover switch 9 shown in FIG. 6 is removed so that the unit is used as a dedicated slave unit.

Operation of the range-finding system as constructed above will be described in the following.

First, the master unit 2 is set to transmit the response signal b in the form of radio waves by operating the sound/radio changeover switch 52. After the master unit 2 has been calibrated, the slave unit 1 is set to execute the aforementioned range-finding mode routine. When the transmit/OK switch 12 is pressed, the slave unit 1 transmits an acoustic interrogation signal a of about 4 kHz, for example, containing ID number data corresponding to the hole number of the master unit 2.

Upon receiving the interrogation signal a from the slave unit 1, the master unit 2 processes the interrogation signal a and verifies that the interrogation signal a has been addressed to itself. Then, the master unit 2 calculates delay time Td by substituting a correction distance H set in the calibration process into equation (4) below:

$$Td=(X-H)/v \quad (4)$$

where v is the sound velocity at which acoustic signals propagate and X is a predetermined distance from the master unit 2. When the delay time Td has elapsed, the master unit 2 transmits the response signal b in the form of radio waves at about 426 MHz.

if the waiting time until the response signal b from the master unit 2 is received is shorter than the predefined time T0, the slave unit 1 calculates the target distance L up to the pin 3 by substituting the value of the waiting time into equation (5) below:

$$L=vT-X \quad (5)$$

Subsequently, the slave unit 1 indicates the target distance L, erases the distance readout and deactivates itself, or goes into a "sleep" status, after a predefined time period has elapsed.

The reason why equations (4) and (5) have been introduced in the foregoing discussion is explained in the following. Provided that the player is located at point $x_1$ (from where the target distance L is measured), the pin 3 at target point $x_2$, and the master unit 2 at point $x_3$, the waiting time T of the slave unit 1 is given by the following equation:

$$T=(x_3-x_1)/v+(X-(x_3=x_2))/v \quad (6)$$

It would be understood that equation (5) applied to the slave unit 1 can be derived by modification of equation (6) above. It would also be recognized that the second term of equation (6) can be expressed by equation (4).

Further explanation of the range-finding system of the second embodiment is omitted because remaining part of its operation is the same as already described with reference to the first embodiment.

According to the above-described construction, the range-finding system comprises distance indicating means (slave unit 1) for calculating and indicating the target distance L from the player's location to the target where the pin 3 or other target object is placed, based on the waiting time from the transmission of the acoustic interrogation signal a up to the reception of the radio wave response signal b, and responding means (master unit 2) placed at the correction distance H from the target object for transmitting the radio wave response signal b when the delay time corresponding to the correction distance H has elapsed from the reception of the interrogation signal a.

In this range-finding system, the master unit 2 transmits the response signal b in the form of radio waves inaudible to players so that more quiet environments of a golf course can be obtained compared to the first embodiment of which response signal b is transmitted in the form of sound waves. Furthermore, since the interrogation signal a and response signal b have completely different audio and radio frequencies, there arise no interference problems in signal transmission and reception, making it possible to eventually reduce the work load required for signal processing.

As seen above, the master unit 2 of the second embodiment is provided with the sound/radio changeover switch 52 for choosing whether to activate the radio wave transmit block B1 or sound wave transmit circuit 15. This means that the master unit 2 can be switched for dual, use by the sound/radio changeover switch 52 depending on whether the slave unit 1 contains receiver circuits for radio waves or sound waves.

What is claimed is:

1. A range-finding system for measuring a target distance from a point of measurement to a target object, comprising:

distance calculating means for calculating the target distance based on a waiting time from transmission of an interrogation signal to reception of a response signal; and responding means placed at a correction distance apart from the target object for transmitting the response signal when a delay time calculated based on the correction distance has elapsed from reception of the interrogation signal.

2. The range-finding system as claimed in claim 1 wherein both the interrogation signal and response signal are transmitted in the form of sound waves.

3. The range-finding system as claimed in claim 1 wherein said distance calculating means and said responding means are each assigned with unique ID number data, said distance calculating means and said responding means transmit signals containing the ID number data and recognize that received signals are addressed thereto only when a correlation between the received ID number data and the assigned ID number data is equal to or greater than a predefined criterion.

4. The range-finding system as claimed in claim 3 wherein said distance calculating means is set to a smaller value of criterion than said responding means.

5. The range-finding system as claimed in claim 1 wherein said distance calculating means re-transmits a signal upon receiving the response signal, and wherein said responding means determines the correction distance based on a time period from transmission of the response signal to said distance calculating means located at the point of measurement until reception of the signal returned from said distance calculating means.

6. The range-finding system as claimed in claim 1 wherein both the interrogation signal and said response signal are transmitted in the form of sound waves, and wherein said distance calculating means calculates the target distance from vT/2−X, where v is a signal propagating velocity, T is a waiting time, and X is a predetermined distance value from said responding means, while said responding means includes second calculating means which calculates the delay time from (X−H)×2/v, where v is the signal propagating velocity, H is the correction distance, and X is the predetermined distance value from said responding means.

7. The range-finding system as claimed in claim 1 wherein the interrogation signal is transmitted as sound waves while the response signal is transmitted as radio waves.

8. The range-finding system as claimed in claim 1 wherein the interrogation signal is transmitted as sound waves while the response signal is transmitted as radio waves, and wherein said distance calculating means calculates the target distance from vT−X, where v is a signal propagating velocity, T is the waiting time and X is a predetermined distance value from said responding means, while said responding means includes second calculating means which calculates the delay time from (X−H)/v, where v is the signal propagating velocity, H is the correction distance, and X is the predetermined distance value from said responding means.

9. The range-finding system as claimed in claim 1 wherein said responding means includes radio wave transmit means for transmitting the response signal as radio waves, sound wave transmit means for transmitting the response signal a sound waves, sound wave receive means for receiving the interrogation signal as sound waves, and a sound/radio changeover switch for choosing whether to activate said radio wave transmit means or sound wave transmit means.

10. A range-finding system as claimed in claim 1, further comprising:

an indicator indicating said target distance calculated by said distance calculating means.

11. A range-finding system for measuring a target distance from a golf player's position to a pin comprising:

portable processor means for calculating the target distance based on a waiting time from transmission of an acoustic interrogation signal to reception of an acoustic response signal, said portable processor means disposed at said golf player's position;

responding means, placed at a correction distance apart from the pin, for transmitting the response signal when a delay time calculated based on the correction distance has elapsed from reception of the interrogation signal; and an indicator indicating said target distance calculated by said portable processor means.

12. A range-finding system for measuring a target distance from a point of measurement to a target object comprising:

distance calculating means and indicating means for calculating and indicating, respectively the target distance based on a waiting time from transmission of an interrogation signal to reception of a response signal; and responding means placed at a correction distance from the target object for transmitting the response signal when a delay time corresponding to the correction distance has elapsed from reception of the interrogation signal;

wherein said distance calculating means and responding means include a same circuit configuration, each including transmit/receive means for transmitting and receiving the interrogation signal and response signal, memory means for storing the data, control means for controlling said circuit elements, switching means for entering commands for selecting desired operation modes to said control means, and said indicating means includes display means for displaying contents of data; and wherein either of said distance calculating means and said responding means work as said distance calculating means or said responding means by selecting a setting of the switching means.

13. The range-finding system as claimed in claim 12 wherein at least one of said distance calculating means indicating means and said responding means has a trap circuit, said trap circuit preventing a signal transmitted by said at least one of said distance calculating means, said indicating means and said responding means from being received by said at least one of said distance calculating means, said indicating means and said responding means directly enter its own receive circuit and a signal received from the other means can enter the receive circuit.

14. The range-finding system as claimed in claim 12 wherein said transmit/receive means includes a receive circuit for outputting the received signal to said control means after signal processing and a receive circuit power switch for limiting active periods of said receive circuit to a specified time period after signal transmission.

15. The range-finding system as claimed in claim 12 wherein said display means erases displayed data when a specified time period has elapsed after displaying the data.

16. The range-finding system as claimed in claim 12 further comprising:

a memory backup power supply for keeping alive data contents of said memory means even when said control means is deactivated.

17. The range-finding system as claimed in claim 12 further comprising:

a timer for specifying an operation inhibit time period of said control means.

18. The range-finding system as claimed in claim 17 wherein said timer specifies an operation inhibit time period corresponding to a closed time period of a golf course.

19. A range-finding system for measuring a target distance from a point of measurement to a target object comprising:

transmitting means for radiating interrogation signals;

responding means placed at a correction distance apart from the target object for transmitting a response signal when a delay time calculated based on the correction distance has elapsed from reception of the interrogation signal; and distance calculating means for calculating the target distance based on a waiting time from transmission of an interrogation signal to reception of a response signal.

20. A range-finding system as claimed in claim 19, further comprising:

an indicator indicating said target distance calculated by said distance calculating means.

21. The range-finding system as claimed in claim 19 wherein said transmitting means transmits an interrogation signal and said responding means transmits a response signal in response to the interrogation signal and said transmitting means re-transmits a signal in response to the response signal, and said responding means determines the correction distance based on a time period from the transmission of the response signal to the reception of the signal from the transmitting means.

22. A range-finding system for measuring a distance from a golf player's position to a pin comprising:

transmitting means for radiating interrogation signals;

responding means, placed at a correction distance apart from the pin, for transmitting a response signal when a delay time calculated based on the correction distance has elapsed from reception of the interrogation signal;

portable processor means for calculating the target distance based on a waiting time from transmission of an interrogation signal to reception of a response signal; and an indicator indicating said target distance calculated by said portable processor means.

23. A range-finding system for measuring a target distance from a point of measurement to a target object, comprising:

distance calculating means for calculating the target distance based on a waiting time from transmission of an interrogation signal to reception of a response signal and a predetermined distance value; and responding means placed at a correction distance apart from the target object for transmitting the response signal when a delay time calculated based on the correction distance and the predetermined distance value has elapsed from reception of the interrogation signal.

24. A range-finding system as claimed in claim 23, further comprising:

an indicator indicating said target distance calculated by said distance calculating means.

25. A range-finding system as claimed in claim 23, wherein said predetermined distance value is greater than said correction distance.

* * * * *